(12) United States Patent
Okumura et al.

(10) Patent No.: US 10,633,297 B2
(45) Date of Patent: Apr. 28, 2020

(54) METHOD OF MANUFACTURING HONEYCOMB STRUCTURE

(71) Applicant: NGK Insulators, Ltd., Nagoya (JP)

(72) Inventors: Kensuke Okumura, Nagoya (JP); Tomoya Taguchi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 16/288,492

(22) Filed: Feb. 28, 2019

(65) Prior Publication Data
US 2019/0284105 A1   Sep. 19, 2019

(30) Foreign Application Priority Data

Mar. 16, 2018  (JP) ................. 2018-049830
Feb. 20, 2019  (JP) ................. 2019-028747

(51) Int. Cl.
*C04B 41/81*   (2006.01)
*B28B 11/04*   (2006.01)
(Continued)

(52) U.S. Cl.
CPC .............. *C04B 41/81* (2013.01); *B05D 1/002* (2013.01); *B05D 1/26* (2013.01); *B05D 5/00* (2013.01);
(Continued)

(58) Field of Classification Search
CPC . C04B 38/0006; C04B 41/0018; C04B 41/45; C04B 41/4505; C04B 41/4535; C04B 41/4539; C04B 41/4578; C04B 41/4586; C04B 41/50; C04B 41/5024; C04B 41/5025; C04B 41/5027; C04B 41/5041; C04B 41/5046; C04B 41/5059; C04B 41/80; C04B 41/85; C04B 41/87; C04B 2103/60; B28B 11/04;
(Continued)

(56) References Cited

U.S. PATENT DOCUMENTS 5,629,067 A      5/1997  Kotani et al.
2008/0241465 A1*  10/2008  Ido ................. B01D 39/2075
                                              428/116

(Continued)

FOREIGN PATENT DOCUMENTS

JP   2631729 B2   5/1997
JP   5345502 B2  11/2013

*Primary Examiner* — William P Fletcher, III
(74) *Attorney, Agent, or Firm* — Burr & Brown, PLLC (57) ABSTRACT

A method of applying a circumferential coating material on a circumferential surface of a ceramic honeycomb structure to form a circumferential coat layer.
The method includes vertically aligning the longitudinal axis of the ceramic honeycomb structure, rotating the ceramic honeycomb structure around the vertically-aligned longitudinal axis, and applying the circumferential coating material on the circumferential surface of the rotating honeycomb structure at a discharge speed of 50 to 120 mm/s, calculated by Discharge speed $V$ [mm/s]=Supplied amount $q$ [g/s] of circumferential coating material÷(Density $\rho$ [g/mm$^3$] of circumferential coating material× Area $S$ [mm$^2$] of discharge opening).

5 Claims, 4 Drawing Sheets

(51) Int. Cl.
| | |
|---|---|
| C04B 41/00 | (2006.01) |
| C04B 38/00 | (2006.01) |
| C04B 41/45 | (2006.01) |
| C04B 41/50 | (2006.01) |
| C04B 41/80 | (2006.01) |
| C04B 41/85 | (2006.01) |
| C04B 41/87 | (2006.01) |
| B05D 7/24 | (2006.01) |
| B05D 1/26 | (2006.01) |
| B05D 5/00 | (2006.01) |
| B05D 1/00 | (2006.01) |
| C04B 103/60 | (2006.01) |

(52) U.S. Cl.
CPC ............... *B05D 7/24* (2013.01); *B28B 11/04* (2013.01); *B28B 11/048* (2013.01); *C04B 38/0006* (2013.01); *C04B 41/009* (2013.01); *C04B 41/0018* (2013.01); *C04B 41/45* (2013.01); *C04B 41/4505* (2013.01); *C04B 41/4535* (2013.01); *C04B 41/4539* (2013.01); *C04B 41/4578* (2013.01); *C04B 41/4586* (2013.01); *C04B 41/50* (2013.01); *C04B 41/5024* (2013.01); *C04B 41/5025* (2013.01); *C04B 41/5027* (2013.01); *C04B 41/5041* (2013.01); *C04B 41/5046* (2013.01); *C04B 41/5059* (2013.01); *C04B 41/80* (2013.01); *C04B 41/85* (2013.01); *C04B 41/87* (2013.01); *B05D 2203/30* (2013.01); *B05D 2401/00* (2013.01); *B05D 2401/20* (2013.01); *B05D 2401/40* (2013.01); *C04B 2103/60* (2013.01)

(58) Field of Classification Search
CPC ......... B28B 11/048; B05D 1/002; B05D 1/26; B05D 5/00; B05D 7/24; B05D 2203/30; B05D 2401/00; B05D 2401/20; B05D 2401/40
See application file for complete search history.

(56) References Cited

U.S. PATENT DOCUMENTS

| | | | | |
|---|---|---|---|---|
| 2009/0217524 | A1* | 9/2009 | Domey | B28B 11/243 29/890 |
| 2010/0119719 | A1* | 5/2010 | Kono | B01J 35/04 427/372.2 |
| 2014/0087080 | A1* | 3/2014 | Fujioka | B05D 1/42 427/355 |
| 2015/0105896 | A1* | 4/2015 | Hagg | C04B 41/85 700/123 |
| 2015/0268174 | A1* | 9/2015 | Citriniti | B28B 19/0038 356/237.2 |
| 2017/0239840 | A1* | 8/2017 | Adams | B28C 7/0418 |

* cited by examiner

METHOD OF MANUFACTURING HONEYCOMB STRUCTURE

The present application is an application based on JP 2018-049830 filed on Mar. 16, 2018 and JP2019-28747 filed on Feb. 20, 2019 with Japan Patent Office, the entire contents of which are incorporated herein by reference.

BACKGROUND OF THE INVENTION

Field of the Invention

The present invention relates to a method of manufacturing a honeycomb structure. More particularly, the present invention relates to a method of manufacturing a honeycomb structure (circumferentially coated honeycomb structure) that includes a circumferential coat layer excellent in surface smoothness with a uniform thickness by applying a slurry-like circumferential coating material on a circumferential surface.

Description of the Related Art

Conventionally, a ceramic honeycomb structure is used for various broad applications such as a catalyst carrier for automobile exhaust-gas purification, a diesel particulate removal filter, a gasoline particulate removal filter, and a heat storage body for a combustion apparatus. Herein, a ceramic honeycomb structure (hereinafter, simply referred to as "honeycomb structure") is manufactured by performing extrusion molding from an extrusion die by using a honeycomb formed body manufacturing apparatus to obtain a honeycomb formed body and then by further firing the honeycomb formed body at high temperature by using a firing furnace. As a result, it is possible to manufacture a honeycomb structure that includes a porous partition wall defining a plurality of cells of which each forms a fluid through the channel and extends from one end face to another end face.

In recent years, a honeycomb structure used for a catalyst carrier for exhaust gas purification, a particulate removal filter, etc. of an automobile engine requires to improve purification performance in order to cope with exhaust gas regulations that are strengthened year by year from the consideration for environmental problems. In order to correspond to this request, reducing the weight of the honeycomb structure is required with the aim of raising a rate of temperature increase of a catalyst loaded in the honeycomb structure and early activating the catalyst.

For that reason, there has been advanced the development of "wall-thinning" of thinning the thickness of the porous partition wall of the honeycomb structure and "high porosity" of further raising the porosity of the porous partition wall. On the other hand, a demerit accompanied by the wall-thinning and the high porosity of the honeycomb structure may include the decrease in the mechanical strength of the honeycomb structure itself. In other words, for the sake of the wall-thinning, the high porosity, etc., the mechanical strength of the partition wall itself may be decreased compared to the conventional.

As a result, even if a weak impact is externally added to the honeycomb structure, cracks, breakage, etc. may appear on the partition wall. As described above, if cracks, chipping, etc. occur in the partition wall of the honeycomb structure due to an impact, etc., a basic function is impaired when it is used as a catalyst carrier for exhaust gas purification of an automobile, and the likes. For that reason, it is expected to develop a honeycomb structure that achieves the high porosity of the honeycomb structure and has the practical sufficient mechanical strength.

Moreover, a honeycomb structure corresponding to various industrial, technical fields may be manufactured, and thus a large-sized honeycomb structure having a honeycomb diameter larger than the usual is developed. When the large-sized honeycomb structure is integrally formed by extrusion molding, a shape of the partition wall, etc. particularly located at the circumferential periphery is not stabilized, and thus the product shape and dimensional accuracy of the honeycomb structure may be decreased.

Therefore, in order to resolve the above trouble, a circumferential coat layer (circumferential wall) may be provided by grinding the circumferential surface of the extruded honeycomb structure by using a grinding wheel etc. to constantly adjust a honeycomb diameter and then applying a circumferential coating material that contains a powdery ceramic raw material and is prepared in a slurry state on the circumferential surface (grinding surface) of the honeycomb structure to be dried or fired (e.g., see Patent Document 1 and Patent Document 2). As a result, even in the case of the large-sized honeycomb structure having a large honeycomb diameter, a product shape etc. can be stabilized.

As above, the honeycomb structure (circumferentially coated honeycomb structure) on which the circumferential coat layer (circumferential wall) is provided has the improved mechanical strength. Furthermore, because the circumferential surface is previously ground to adjust a honeycomb diameter and then the circumferential coating material is applied to form the circumferential coat layer, the honeycomb structure has an advantage that the improvement (improvement of impact resistance) of the above mechanical strength is performed and it is excellent in dimensional stability of constantly maintaining the size of the final product shape.

Figure 6:
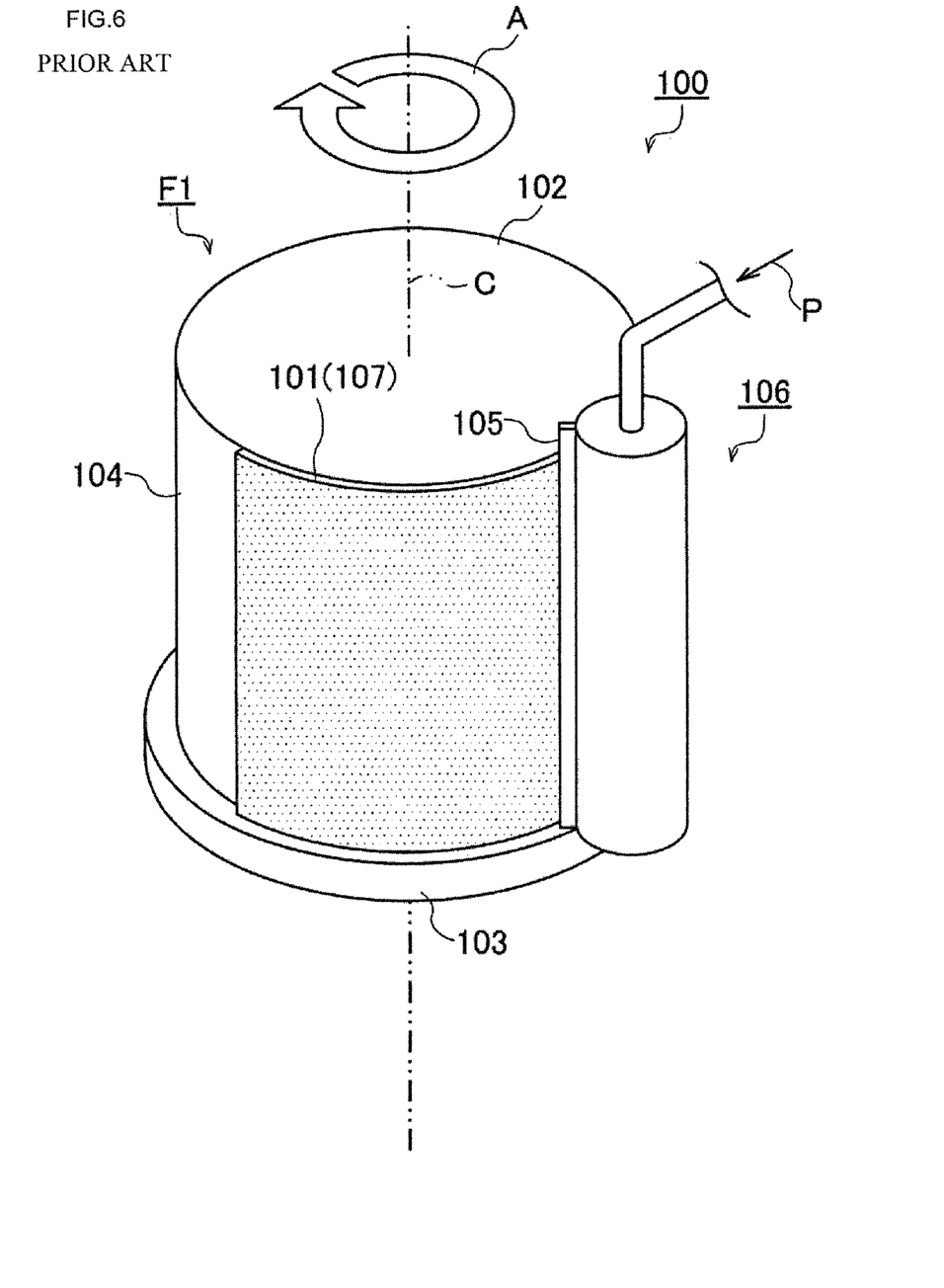
FIG. 6 is an explanatory diagram schematically showing an example of a conventional circumferential coat layer forming process and a coating applicator used for this method.

A circumferential coat layer forming process for forming the circumferential coat layer is mainly performed by using a coating applicator 100 as schematically shown in FIG. 6, for example. The coating applicator 100 is configured to mainly include: a turntable 103 that places thereon a target honeycomb structure 102 on which a circumferential coat layer 101 is formed and rotates at constant speed in a prescribed rotation direction A by using an axial direction as a rotation center C; and a discharge nozzle 106 that is close to a circumferential surface 104 of the honeycomb structure 102 placed on the turntable 103 and further causes a discharge opening 105 to face the circumferential surface 104.

The discharge nozzle 106 is connected to the other configuration such as a tank (not shown) that retains a circumferential coating material 107 and a discharge mechanism (not shown) that adds a predetermined discharge pressure P to the circumferential coating material 107 to discharge the material from the discharge opening 105. As a result, the circumferential coating material 107 can be discharged from the discharge opening 105 onto the circumferential surface 104 of the honeycomb structure 102.

On the other hand, because the honeycomb structure 102 placed on the turntable 103 rotates at a constant speed in the constant rotation direction A, the relative positional relationship between the circumferential surface 104 of the honeycomb structure 102 and the discharge opening 105 of the discharge nozzle 106 changes from moment to moment. For that reason, the circumferential coating material 107 discharged with a prescribed discharge pressure is applied onto the rotated honeycomb structure 102 in a constant amount each time. Further, drying is performed thereon to form the circumferential coat layer 101 having a uniform thickness, and the honeycomb structure 102 including the circumferential coat layer 101 is manufactured. In addition, FIG. 6 does not show the configuration of cells, a partition wall, etc. on the honeycomb structure 102 for simplification.

[Patent Document 1] JP2613729
[Patent Document 2] JP5345502

The formation of the circumferential coat layer using the above coating applicator may cause the following trouble. In other words, the adjustment of viscosity of the slurry-like circumferential coating material is performed to adapt the circumferential coating material to the coating onto the circumferential surface of the honeycomb structure. In this case, the adjustment of the viscosity is mainly performed by changing the addition amount of water with respect to powdery ceramic raw material acting as the raw material of the circumferential coating material. More specifically, a kneaded object is previously prepared by mixing and kneading a ceramic raw material, water, etc. to have higher viscosity than standard viscosity and then water is gradually added to the kneaded object so as to perform fine adjustment up to viscosity suitable for the coating onto the circumferential surface.

If the viscosity of the circumferential coating material is high, a sufficient amount of circumferential coating material is not applied on the circumferential surface of the honeycomb structure, and thus the thickness of the circumferential coat layer may become thin or uncoating may occur in a portion of the circumferential surface. Additionally, there is a possibility that large unevenness is generated on the surface of the circumferential coat layer. In this case, the thickness of the circumferential coat layer becomes non-uniform, and thus the dimensional stability of the honeycomb structure may be inferior.

Furthermore, the coating amount of the circumferential coating material becomes non-uniform, and thus a crack is easy to occur during drying. Moreover, in the circumferential coated honeycomb structure, bar-code printing, etc. may be generally performed on the surface of the circumferential coating layer with the aim of the product management after manufacturing. In this case, the printed bar-code becomes indistinct due to the ununiformity of the thickness of the circumferential coat layer, and thus reading error by a bar-code scanner may occur frequently.

On the other hand, if the viscosity of the circumferential coating material is low, the circumferential coating material applied on the circumferential surface of the honeycomb structure may drop due to a gravitational force. For that reason, the thickness of the circumferential coat layer may become non-uniform at one end face (upper end side) and another end face (lower end side) of the circumferentially coated honeycomb structure. As a result, the same problem as that of the case where viscosity is high may occur.

Moreover, the supplied amount of the circumferential coating material becomes more as the viscosity is lower, and thus much circumferential coating material is applied on the circumferential surface. In this case, the surplus circumferential coating material is scraped off by a spatula etc. close to the discharge opening. For that reason, the cost for the circumferential coating material may be raised. In other words, it is extremely difficult to adjust the viscosity of the circumferential coating material to maintain the viscosity in an appropriate state, the processing cost accompanied with the decrease in yield and the increase in the used amount of the circumferential coating material is increased, and an excessive burden is imposed on an operator for the sake of the adjustment.

The slurry-like circumferential coating material formed by mixing and kneading ceramic powder and water has a property that the viscosity changes in accordance with a flow velocity (discharge speed). In other words, as a shear rate increases, the viscosity (viscous property) decreases and thus the circumferential coating material has a state in which the coating is easily performed. The present applicant focuses attention on the above characteristics of the slurry-like circumferential coating material, and has found that the trouble as described above can be resolved by appropriately controlling the discharge speed (flow velocity) of the circumferential coating material discharged from the discharge nozzle.

In other words, the circumferential coating material can be controlled so that the material has low viscosity and is excellent in coatability when applying the circumferential coating material on the circumferential surface of the honeycomb structure and the material has high viscosity and does not drip from the circumferential surface at the step at which the coating of the circumferential coating material onto the circumferential surface is completed.

Therefore, the present invention has been achieved in view of the above problems, and an object of the invention is to provide a method of manufacturing a honeycomb structure in which the discharge speed of the circumferential coating material is controlled to be able to form the circumferential coat layer having a uniform thickness.

SUMMARY OF THE INVENTION

According to the present invention, there is provided the following method of manufacturing a honeycomb structure.

According to a first aspect of the present invention, a method of manufacturing a honeycomb structure is provided, including a circumferential coat layer forming process of applying a circumferential coating material on a circumferential surface of a ceramic honeycomb structure to form a circumferential coat layer, the circumferential coat layer forming process including: a rotating process of matching an axial direction of the honeycomb structure with a vertical direction to rotate the honeycomb structure by using the axial direction as a rotation center; and an applying process of discharging the circumferential coating material from a discharge nozzle disposed at a position opposite to the circumferential surface of the honeycomb structure to apply the circumferential coating material on the circumferential surface of the honeycomb structure that rotates, wherein in the applying process, a discharge speed of the circumferential coating material, calculated by Equation (1), discharged from the discharge nozzle is 50 to 120 mm/s, and Discharge speed V [mm/s] = Supplied amount $q$ [g/s] of circumferential coating material ÷(Density $\rho$[g/mm$^3$] of circumferential coating material ×Area $S$ [mm$^2$] of discharge opening)  (1).

According to a second aspect of the present invention, in the method of manufacturing the honeycomb structure according to the first aspect is provided, an area of a discharge opening of the discharge nozzle opened to face the circumferential surface is in a range of 200 to 600 mm$^2$.

According to a third aspect of the present invention, in the method of manufacturing the honeycomb structure according to the first or second aspects is provided, the discharge opening of the discharge nozzle has a trapezoid and a lower-end width is formed to be larger than an upper-end width of the discharge opening.

According to a fourth aspect of the present invention, in the method of manufacturing the honeycomb structure according to any one of the first to third aspects is provided, a rotation number of the honeycomb structure in the rotating process is in a range of 5 rpm to 15 rpm.

According to a fifth aspect of the present invention, in the method of manufacturing the honeycomb structure according to any one of the first to fourth aspects is provided, in the applying process, a discharge-amount/coating-amount ratio calculated by Equation (2) is in a range of 1.1 to 3.5, Discharge-amount/coating-amount ratio = Discharge amount $d$ [g] of circumferential coating material / Coating amount $c$ [g] of circumferential coating material     (2), and the discharge amount $d$ [g] of the circumferential coating material is calculated by "the supplied amount $q$ [g/s] of the circumferential coating material ×a coating time [s]", and the coating amount $c$ [g] of the circumferential coating material is calculated by "a mass [g] of the honeycomb structure after the circumferential coating material is applied - a mass [g] of the honeycomb structure before the circumferential coating material is applied".

Effects of the Invention

According to the method of manufacturing the honeycomb structure of the present invention, the circumferential coating material can be made to have the viscosity suitable for the coating onto the circumferential surface by changing the discharge speed without changing the moisture content of the circumferential coating material and thus the circumferential coat layer having a uniform thickness can be formed.

DESCRIPTION OF THE PREFERRED EMBODIMENTS

Hereinafter, exemplary embodiments of a method of manufacturing a honeycomb structure according to the present invention will be explained with reference to the accompanying drawings. In addition, a method of manufacturing a honeycomb structure according to the present invention is not limited to the following embodiments, and change, modification, improvement, etc. can be added to the method without departing from the scope of the present invention.

A honeycomb structure manufacturing method 1 (hereinafter, simply referred to as "manufacturing method 1") according to one embodiment of the present invention includes a circumferential coat layer forming process F1 for applying a circumferential coating material 5 on a circumferential surface 3 of a honeycomb structure 2 made of ceramics to form a circumferential coat layer 7 having a predetermined thickness.

Figure 1:
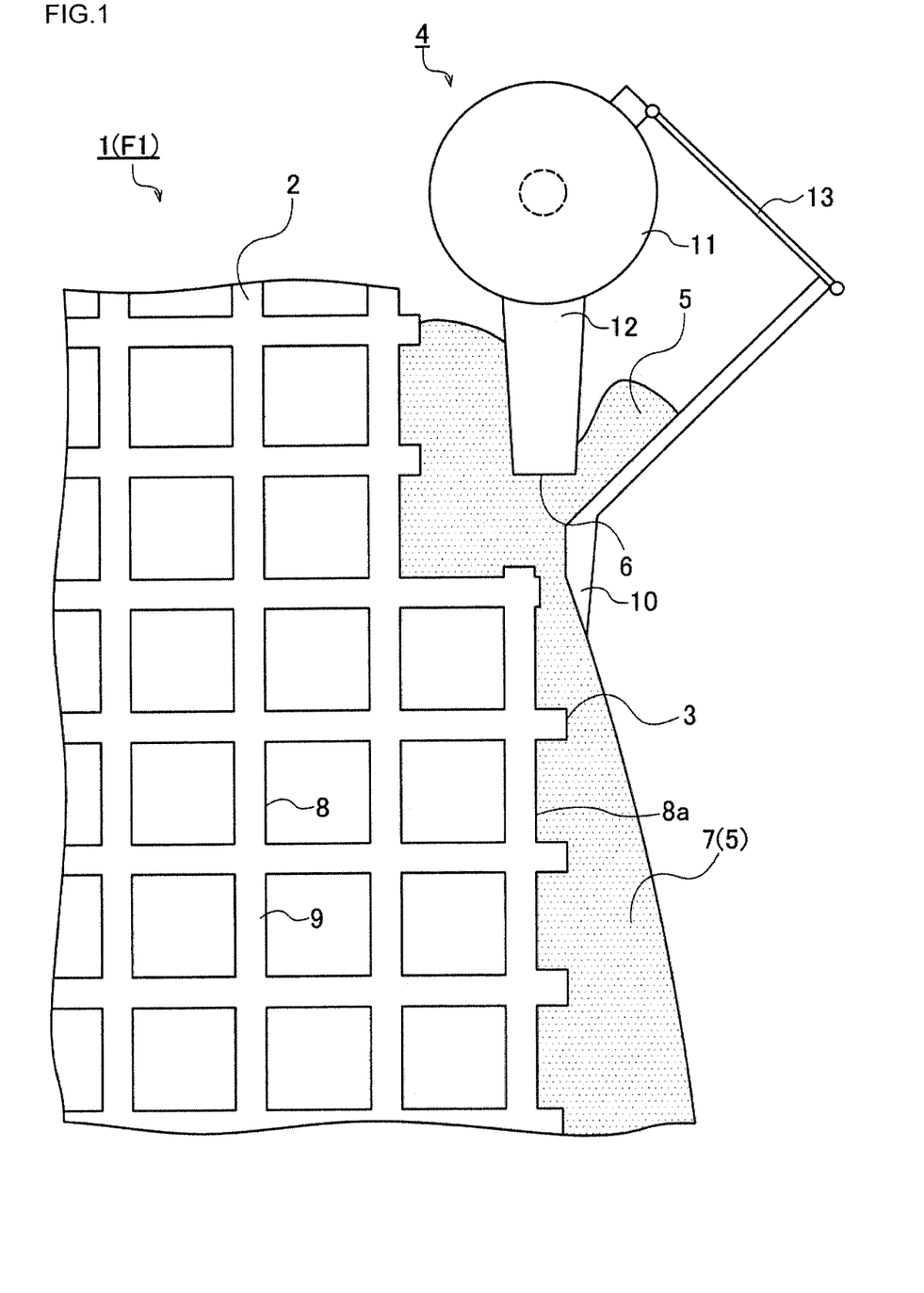
FIG. 1 is an explanatory diagram schematically showing a circumferential coat layer forming process as an example viewed from the upper side.

As illustrated in FIG. 1 etc., the circumferential coat layer forming process F1 in the manufacturing method 1 according to the present embodiment further includes: a rotating process for matching an axial direction of the honeycomb structure 2 with a vertical direction to rotate the honeycomb structure 2 at constant speed at a predetermined rotational speed by using the axial direction as a rotation center (see FIG. 6); and an applying process for discharging the circumferential coating material 5 from a discharge nozzle 4 disposed at a position opposite to the circumferential surface 3 of the honeycomb structure 2 to apply the circumferential coating material 5 along the circumferential surface 3 of the honeycomb structure 2 that rotates by the rotating process.

Herein, the above rotating process and applying process (the circumferential coat layer forming process F1) can be mainly performed by using the coating applicator 100 shown in FIG. 6 as explained previously. The coating applicator 100 is configured to mainly include: the turntable 103 that places thereon the honeycomb structure 2 as a coating target to rotate at constant speed in accordance with the prescribed rotation direction A by using the axial direction of the honeycomb structure 2 as the rotation center C; and the discharge nozzle 4 that is disposed so as to face the circumferential surface 3 of the honeycomb structure 2 to discharge the circumferential coating material 5 from a discharge opening 6 (see FIG. 6).

Because the details of the other configuration of the coating applicator 100 and the formation of the circumferential coat layer 7 are explained previously, detailed descriptions are omitted. Furthermore, in the following present specification, any of "honeycomb structure before forming circumferential coat layer" and "honeycomb structure (=circumferentially coated honeycomb structure) after forming circumferential coat layer" may be referred to as "the honeycomb structure 2" for the sake of convenience. In addition, "the honeycomb structure 2 before the formation" and "the honeycomb structure 2 after the formation" may be differentially called if needed.

The circumferential coating material 5 used in the manufacturing method 1 according to the present embodiment can employ a well-known ceramic raw material as a principal component. For example, the circumferential coating material may employ particulate cordierite, silicon carbide, titanium oxide, or the like. The slurry-like circumferential coating material 5 suitable for the coating onto the circumferential surface 3 of the honeycomb structure 2 can be made by mixing well-known materials such as a pore former, binder, surfactant, and dispersing medium with these particulate ceramic raw materials at a predetermined compounding ratio.

On the other hand, the honeycomb structure 2 on which the circumferential coating material 5 is to be applied is obtained by processing of performing extrusion on a ceramic raw material in a predetermined shape (substantially round pillar shape etc.), firing, and the like, and is configured by using a well-known ceramic raw material such as cordierite and silicon carbide as a principal component similarly to the circumferential coating material 5. Herein, because the configuration and the manufacturing method of the honeycomb structure 2 are already well-known, detailed descriptions are omitted.

The honeycomb structure 2 before the formation is subjected to the extrusion molding process and the firing process and then the circumferential surface 3 is previously ground further, and thus the size of the honeycomb structure 2 is adjusted to be within the range of a predetermined honeycomb diameter. As a result, the circumferential coat layer 7 having uniform thickness can be formed by applying a constant amount of the circumferential coating material 5 onto the circumferential surface 3.

Herein, because the circumferential surface 3 of the honeycomb structure 2 is previously ground, a portion of a partition wall 9 defining cells 8 of the honeycomb structure 2 is regarded to be exposed on the circumferential surface 3 as typically shown in FIG. 1. In other words, incomplete-shape cells (incomplete cells 8a) that are not quadrangular appear on the circumferential surface 3. The circumferential coating material 5 can be filled up into spaces inside the incomplete cells 8a and can be formed as the circumferential coat layer 7 by applying the circumferential coating material 5 on the circumferential surface 3 of the honeycomb structure 2 on which the incomplete cells 8a appear.

A scraping spatula 10 that scrapes off a portion of the circumferential coating material 5 discharged from the discharge opening 6, namely the "surplus" circumferential coating material 5, which is not filled up into the incomplete cells 8a and does not form the circumferential coat layer 7 having the predetermined thickness, from the circumferential surface 3 so as to achieve the surface smoothing of the circumferential coat layer 7 is provided near the discharge opening 6 of the discharge nozzle 4 (see FIG. 1) of the coating applicator 100 used in the circumferential coat layer forming process F1.

The scraping spatula 10 is connected to the discharge nozzle 4 via an elastically deformable arm 13, and is pressed against the circumferential surface 3 of the honeycomb structure 2 with a predetermined force. As a result, the scraping spatula can scrape off the portion of the circumferential coating material 5 discharged from the discharge opening 6. For that reason, a required amount of the circumferential coating material 5 remains on the circumferential surface 3, and thus the circumferential coat layer 7 having uniform thickness can be formed.

Figure 2:
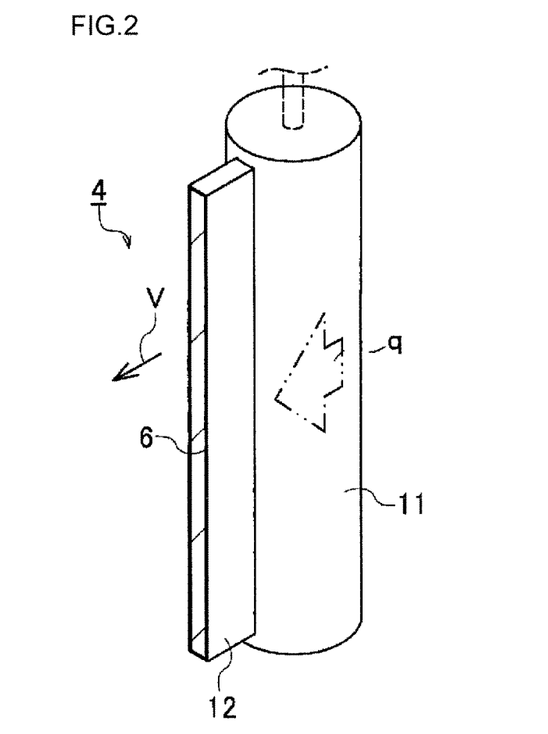
FIG. 2 is an explanatory diagram showing an example of a discharge nozzle.
Figure 3:
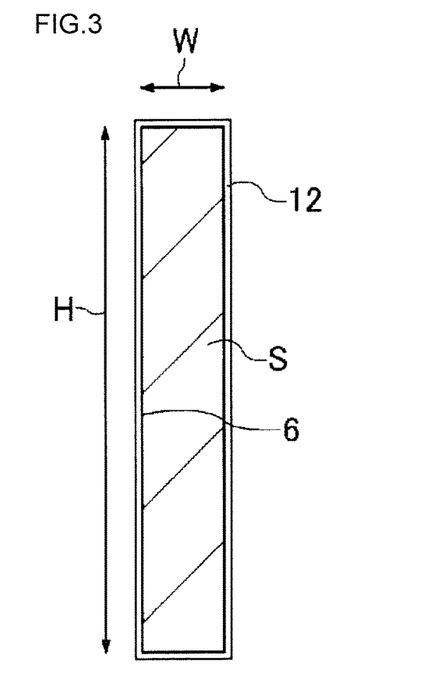
FIG. 3 is an end view showing a discharge opening of the discharge nozzle.

The configuration of the discharge nozzle 4 in the coating applicator 100 will be described in detail. As shown in FIGS. 2 and 3, the discharge nozzle 4 includes a substantially cylindrical nozzle body 11 and a nozzle tip 12 having a substantially pointed cross section protruding from the nozzle body 11. Furthermore, the elongated slit-shaped discharge opening 6 opened so as to face the circumferential surface 3 of the honeycomb structure 2 is provided at the top of the nozzle tip 12. As a result, the circumferential coating material 5 temporarily retained in the nozzle body 11 is discharged to the outside of the discharge nozzle 4 from the discharge opening 6 at the top after passing through the nozzle tip 12 from the nozzle body 11 by adding a discharge pressure by a well-known discharge mechanism such as a discharge pump.

The discharge opening 6 of the discharge nozzle 4 has a rectangular shape as shown in FIG. 3, for example. In this case, the discharge opening has an elongated slit shape in which a height H of the discharge opening is remarkably long compared to a width W of the discharge opening. Herein, the discharge opening is formed so that the height H of the discharge opening is a length equal to or greater than the axial-direction length (honeycomb length L) of the honeycomb structure 2 to be coated with the circumferential coating material 5. As a result, the circumferential coating material 5 can be applied over the entire circumferential surface 3 of the honeycomb structure 2.

It should be noted that the shape of the nozzle tip 12 and the discharge opening 6 of the discharge nozzle 4 are not limited to the example shown in FIGS. 2 and 3. For example, the above shape may be a shape of a discharge nozzle 4a having another configuration example shown in FIGS. 4 and 5. More specifically, the top of a nozzle tip 12a of the discharge nozzle 4a may have a trapezoid. In this case, a discharge opening 6a opened and provided at the top has a trapezoid in which a lower-end width W2 is wider than an upper-end width W1. When applying the circumferential coating material 5, it is required to match the axial direction of the honeycomb structure 2 with a vertical direction to discharge the circumferential coating material 5 onto the circumferential surface 3 in a horizontal direction as shown in FIG. 6.

Figure 4:
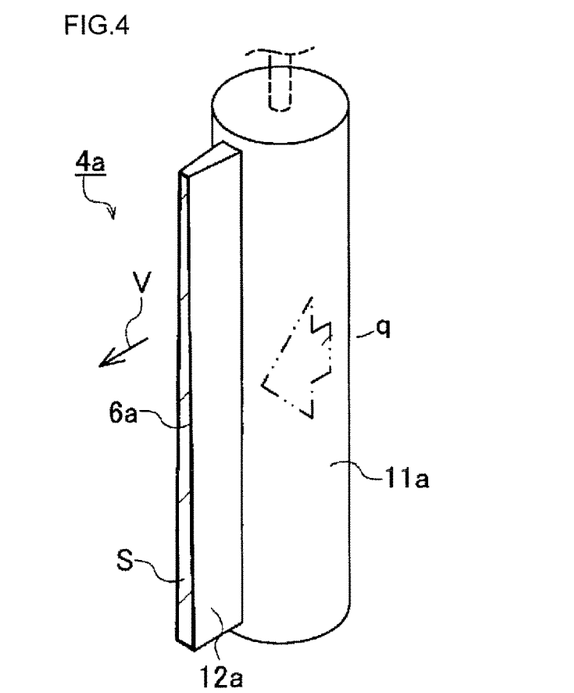
FIG. 4 is an explanatory diagram showing an example of a discharge nozzle according to another configuration example.
Figure 5:
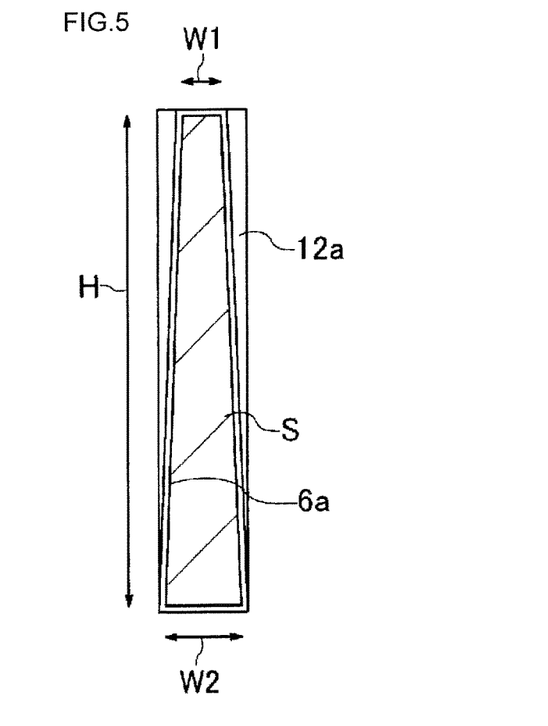
FIG. 5 is an end view showing a discharge opening of the discharge nozzle shown in FIG. 4.

For that reason, dischargeability and coatability are different at the upper and lower sides of the honeycomb structure 2 due to the weight of the circumferential coating material 5. Therefore, as described above, the discharge opening 6a is formed with the narrow upper-end width W1 in order to improve dischargeability with respect to the upper-side circumferential surface 3 of the honeycomb structure 2, and further the discharge opening 6a is formed with the lower-end width W2 wider than the upper-end width W1 so as to discharge the much circumferential coating material 5 with respect to the lower-side circumferential surface 3 that is easily subjected to the weight of the circumferential coating material 5 and has inferior dischargeability. As a result, coatability can be improved at the upper-side and lower-side circumferential surface 3 of the honeycomb structure 2.

In the manufacturing method 1 according to the present embodiment, a discharge speed V of the circumferential coating material 5 can be set within the range of 50 to 120 mm/s. As will be described later, by setting the discharge speed V within the range, the dischargeability from the discharge nozzles 4 and 4a becomes good and a trouble such as dripping from the circumferential surface 3 after the coating does not occur. The more stable circumferential coat layer 7 can be formed by combining the numerical limited range of an area S of the discharge opening as explained previously and the numerical limited range of such the discharge speed V.

The discharge speed V can be calculated based on the following Equation (1).

$$\text{Discharge speed } V \text{ [mm/s]} = \text{Supplied amount } q \text{ [g/s] of circumferential coating material} \div (\text{Density } \rho \text{ [g/mm}^3\text{] of circumferential coating material} \times \text{Area } S \text{ [mm}^2\text{] of discharge opening)} \quad (1)$$

Herein, the supplied amount q of the circumferential coating material is the discharge amount of the circumferential coating material 5 per 1 second, and is determined by the discharging performance of a discharge mechanism (not shown) such as a discharge pump. Moreover, the density of the circumferential coating material can be calculated from the volume and mass of the circumferential coating material, and may be calculated by using a well-known density meter. On the other hand, as described above, the area S of the discharge opening is calculated by measuring the width (or the upper-end width W1 and the lower-end width W2) of the discharge opening and the height H of the discharge opening. In other words, the discharge speed V can be easily calculated by well-known measurement and calculation methods.

Furthermore, in the manufacturing method 1 according to the present embodiment, the discharge-opening area S of the discharge openings 6 and 6a of the discharge nozzles 4 and 4a in the coating applicator 100 used in the circumferential coat layer forming process F1 is set to be in the range of 200 to 600 mm² (see hatched portions in FIGS. 2 to 5). The area S of the discharge opening is an area for each of the open ends of the discharge openings 6 and 6a provided at the tops of the nozzle tips 12 and 12a in the discharge nozzles 4 and 4a.

For example, as shown in FIGS. 2 and 3, when the discharge opening 6 has a rectangular shape, the area S of the discharge opening is calculated by multiplying the width W of the discharge opening by the height H of the discharge opening (area S of discharge opening=width W of discharge opening×height H of discharge opening). On the other hand, as shown in FIGS. 4 and 5, when the discharge opening 6a has a trapezoid, the area S of the discharge opening is calculated by multiplying the height H of the discharge opening by a sum of the upper-end width W1 (=corresponding to upper base) and the lower-end width W2 (=corresponding to lower base) and further dividing the multiplied value by 2 (area S of discharge opening=(upper-end width W1+lower-end width W2)×height H of discharge opening÷2).

Herein, a honeycomb structure whose honeycomb diameter (product diameter) is 305 mm and axial-direction length (honeycomb length L) is 152 mm will be explained as an example. In this case, in the discharge nozzle 4 including the rectangular discharge opening 6, the area S of the discharge opening can be regarded as 267 mm² if the width W of the discharge opening is set to 1.5 mm and the height H of the discharge opening is set to 178 mm, for example, and thus the height H of the discharge opening can be at least not less than the honeycomb length L and the area S of the discharge opening can be suppressed within the range of 200 to 600 mm².

The discharge nozzle used in the circumferential coat layer forming process until now has adjusted the viscosity of the slurry-like circumferential coating material by adjusting the addition amount of moisture as described above. For that reason, there was no technical thought to change the area of the discharge opening of the discharge nozzle to achieve the adjustment of dischargeability of the circumferential coating material. For that reason, in consideration of dischargeability, coatability, etc. of the circumferential coating material with respect to the circumferential surface of the honeycomb structure, the area of the discharge opening was set to a big value, namely to a value more than 600 mm² in many cases.

On the contrary, in case of the manufacturing method 1 according to the present embodiment, the discharge speed V can become larger than that of the conventional discharge nozzle by limiting the area S of the discharge opening of each of the discharge openings 6 and 6a in the discharge nozzles 4 and 4a into the above numeric range. As a result, in the slurry-like circumferential coating material 5 formed by mixing and kneading a ceramic raw material and water, the discharge speed V can be changed by the adjustment of the area S of the discharge opening by using properties that the viscosity changes in accordance with the flow velocity (the discharge speed V). As a result, the viscosity becomes low at the time of the discharge from the discharge openings 6 and 6a to exert good dischargeability, and the viscosity becomes high after being discharged from the discharge openings 6 and 6a and being applied on the circumferential surface 3 and thus the circumferential coating material 5 can be regarded not to drip from the circumferential surface 3.

Furthermore, in the circumferential coat layer forming process F1 of the manufacturing method 1 according to the present embodiment, the rotation number of the honeycomb structure 2 (and the turntable 103) in the rotating process of the honeycomb structure 2 using the coating applicator 100 (see FIG. 6) can be within the range of 5 to 15 rpm.

In other words, the coating applicator 100 shown in FIG. 6 can set the rotation number of the turntable 103 on which the honeycomb structure 2 is placed to be a rotational speed about 5 to 15 rotations per 1 minute. Herein, if the rotation number of the honeycomb structure 2 is high, the discharge amount (supplied amount) of the circumferential coating material 5 discharged from each of the discharge nozzles 4 and 4a does not catch up with the rotation of the honeycomb structure 2, and thus a sufficient amount of the circumferential coating material 5 may not be applied on the circumferential surface 3 of the honeycomb structure 2. In other words, the uncoating of the circumferential coating material 5 may occur on the circumferential surface 3.

On the other hand, if the rotation number of the honeycomb structure 2 is low, the discharge amount of the circumferential coating material 5 is too much, and thus a large quantity of the circumferential coating material 5 may be applied on the circumferential surface 3. In this case, although the surplus circumferential coating material 5 is scraped off by the shown scraping spatula 10, a large quantity of the circumferential coating material 5 still remains adhered to the circumferential surface 3 and the part of the circumferential coating material 5 may drip down in accordance with a gravitational force.

As described above, the rotation number of the honeycomb structure 2 will have a great influence on the coatability of the circumferential coating material 5 onto the circumferential surface 3, along with the area S of the discharge opening of each of the discharge openings 6 and 6a in the discharge nozzles 4 and 4a and the discharge speed V of the circumferential coating material 5 as indicated above. Therefore, the circumferential coat layer 7 excellent in the dimensional stability can be formed by defining the rotation number of the honeycomb structure 2 into the above range in addition to a relationship between the area S of the discharge opening and the discharge speed V.

Furthermore, in the manufacturing method 1 according to the present embodiment, a discharge-amount/coating-amount ratio that is a value obtained by dividing the discharge amount d of the circumferential coating material by the coating amount of the circumferential coating material can be set within the range of 1.1 to 3.5. The good circumferential coat layer 7 without uneven coating and withdrawal marks (to be described in detail below) can be formed without a trouble such as dripping from the circumferential surface 3 after the coating by setting the discharge-amount/coating-amount ratio within this range. More specifically, when the discharge-amount/coating-amount ratio is less than 1.1, because it is impossible to uniformly spread the circumferential coating material on the circumferential surface 3 of the honeycomb structure 2, the circumferential coating material "may not be applied" on the portion of the circumferential surface 3, namely, the uncoated portion of the circumferential coating material may occur. On the other hand, because the supply of the circumferential coating material becomes excessive when the discharge-amount/coating-amount ratio is more than 3.5, in the course where the circumferential coating material moves away from the scraping spatula 10, a large quantity of circumferential coating material may remain on the circumferential surface 3 of the honeycomb structure 2 so as to have a state ("withdrawal marks") where a step is formed. For that reason, when the discharge-amount/coating-amount ratio deviates from the above range, the shape accuracy of the honeycomb structure 2 may become unstable or cracks etc. may become easy to occur on the formed circumferential coat layer 7.

The discharge-amount/coating-amount ratio can be calculated based on the following Equation (2).

Discharge-amount/coating-amount ratio=Discharge amount $d$ [g] of circumferential coating material/Coating amount $c$ [g] of circumferential coating material    (2)

In Equation (2), the discharge amount d [g] of the circumferential coating material can be calculated by multiplying a coating time [s] by the supplied amount q [g/s] of the circumferential coating material per unit time described above. On the other hand, the coating amount c [g] of the circumferential coating material can be calculated by subtracting a mass [g] of the honeycomb structure before the circumferential coating material is applied from a mass [g] of the honeycomb structure after the circumferential coating material is applied.

As described above, according to the manufacturing method 1 of the present embodiment, in the circumferential coat layer forming process F1, the discharge speed V becomes larger than the conventional by setting within a prescribed range the area S of the discharge opening of each of the discharge openings 6 and 6a in the discharge nozzles 4 and 4a that discharge the circumferential coating material 5, and thus the adjustment of viscosity excellent in the dischargeability and coatability can be achieved. As a result, it is not required to adjust the viscosity of the circumferential coating material by using the addition amount of moisture as before, and thus the possibility of occurrence of troubles during the formation of the circumferential coat layer 7 is lowered. Moreover, the circumferential coat layer forming process F1 can have the more stabilized dischargeability and coatability of the circumferential coating material 5 by adjusting the discharge speed V and the rotation number of the honeycomb structure 2 as well as the area S of the discharge opening. Furthermore, uneven coating etc. does not occur on the circumferential coat layer 7 to be formed by adjusting the discharge-amount/coating-amount ratio.

EXAMPLES

Hereinafter, the method of manufacturing the honeycomb structure according to the present invention will be explained based on the following Examples, but the manufacturing method according to the present invention is not limited to these Examples.

In honeycomb structures whose honeycomb diameters and honeycomb lengths are different, circumferential coat layers according to Examples 1 to 8 and Comparative Examples 1 to 6 were formed on the respective circumferential surfaces of the honeycomb structures by changing the rotation number and coating time of each of the honeycomb structures, the supplied amount q of the circumferential coating material per unit time, the discharge-opening area S of the discharge nozzle, the shape of the discharge opening, and the discharge speed V.

1. Examples 1 to 8 and Comparative Examples 1 to 6

Herein, in Examples 1 to 3, honeycomb structures whose honeycomb diameters and the honeycomb lengths are the same are used and the supplied amount q of the circumferential coating material is the same. In Example 1, the rotational speed and the coating time are changed with respect to Example 2. In Example 3, the discharge-opening area S and the discharge speed V of the discharge nozzle are changed with respect to Example 2. On the other hand, in Example 4, the supplied amount q of the circumferential coating material per unit time and the discharge speed V of Example 3 are changed and the other condition is the same as Example 3. On the other hand, Examples 5 and 6 have substantially the same condition as the condition of Example 3 and employ the honeycomb diameter and honeycomb length of the honeycomb structure as a coating target that is different from Example 3. Example 7 has the same rotational speed, coating time, and supplied amount q of the circumferential coating material per unit time as Example 1 and employs the discharge-opening area S and the discharge speed V changed from Example 1. Example 8 has the same rotational speed, coating time, and supplied amount q of the circumferential coating material per unit time as Example 2 and employs the discharge-opening area S and the discharge speed V changed from Example 2. In addition, Examples 1 to 6 employ the shape of the discharge opening that is a trapezoidal shape and Examples 7 and 8 employ the shape of the discharge opening that is a rectangular shape. Any of Examples 1 to 8 satisfies the conditions of the area of the discharge opening, the discharge speed, and the rotation number that are defined in the present invention. On the other hand, in Comparative Examples 1 to 6, any of the discharge-opening area S and the discharge speed deviates from a numeric range defined in the present invention. In addition, Comparative Examples 1 to 5 employ the shape of the discharge opening that is a trapezoidal shape and Comparative Example 6 employs the shape of the discharge opening that is a rectangular shape. A summary of these conditions is indicated in the following Table 1.

TABLE 1

| | Honeycomb structure | | Rotational speed rpm | Coating time s | Supplied amount q of circumferential coating material per unit time g/s | Discharge-opening area S mm$^2$ | Discharge-opening shape | Discharge speed V mm/s |
|---|---|---|---|---|---|---|---|---|
| | Diameter mm | Length mm | | | | | | |
| Example 1 | 305 | 152 | 6 | 10 | 53.7 | 267 | Trapezoid | 116.6 |
| Example 2 | 305 | 152 | 12 | 5 | 53.7 | 267 | Trapezoid | 116.6 |
| Example 3 | 305 | 152 | 12 | 5 | 53.7 | 450 | Trapezoid | 69.2 |
| Example 4 | 305 | 152 | 12 | 5 | 47.1 | 450 | Trapezoid | 60.4 |
| Example 5 | 330 | 178 | 12 | 5 | 81 | 450 | Trapezoid | 69.2 |
| Example 6 | 330 | 203 | 12 | 5 | 81 | 450 | Trapezoid | 69.2 |
| Example 7 | 305 | 152 | 6 | 10 | 53.7 | 534 | Rectangle | 58.3 |
| Example 8 | 305 | 152 | 12 | 5 | 53.7 | 534 | Rectangle | 58.3 |
| Comparative Example 1 | 305 | 152 | 6 | 10 | 53.7 | 801 | Trapezoid | 38.9 |

TABLE 1-continued

|  | Honeycomb structure | | Rotational speed rpm | Coating time s | Supplied amount q of circumferential coating material per unit time g/s | Discharge- opening area S mm² | Discharge- opening shape | Discharge speed V mm/s |
|---|---|---|---|---|---|---|---|---|
|  | Diameter mm | Length mm | | | | | | |
| Comparative Example 2 | 305 | 152 | 12 | 5 | 53.7 | 801 | Trapezoid | 38.9 |
| Comparative Example 3 | 305 | 152 | 6 | 10 | 53.7 | 1157 | Trapezoid | 26.9 |
| Comparative Example 4 | 305 | 152 | 6 | 10 | 81 | 1157 | Trapezoid | 40.4 |
| Comparative Example 5 | 305 | 152 | 12 | 5 | 81 | 1157 | Trapezoid | 40.4 |
| Comparative Example 6 | 305 | 152 | 6 | 10 | 53.7 | 180 | Rectangle | 172 |

2. Evaluation Method

The surface of a circumferential coat layer formed by actually applying a circumferential coating material on the circumferential surface of the honeycomb structure by using the coating applicator (see FIG. 6) described above and drying the circumferential coating material was visually confirmed. In addition, the thickness of the circumferential coat layer was within the range of 0.5 to 1.5 mm and the water content of the circumferential coating material to be discharged and applied was 25 to 28%. Herein, the discharge amount d [g] of the circumferential coating material and the coating amount c [g] of the circumferential coating material in Examples 1 to 8 and Comparative Examples 1 to 6 were calculated to calculate respective discharge-amount/coating-amount ratios. The calculated results are indicated in the following Table 2. At this time, the coating amount c [g] of the circumferential coating material onto the circumferential surface of the honeycomb structure was approximately 200 to approximately 400 g.

Comprehensive evaluation was performed after confirming the honeycomb structure (the circumferentially coated honeycomb structure) on which the circumferential coating material is applied by the coating applicator and confirming the presence or absence of uneven coating and the presence or absence of withdrawal marks. Their results are indicated in the following Table 2.

The evaluation of the uneven coating was visually determined as follows: a honeycomb structure whose circumferential surface is uniformly and completely coated is "good", a honeycomb structure whose circumferential surface has partially non-uniformity but is completely coated and that does not have practical problems is "acceptable", and a honeycomb structure whose circumferential surface has totally non-uniformity or is not partially coated is "unacceptable".

On the other hand, the evaluation for withdrawal marks (step occurring on circumferential coat layer) was performed by measuring a step observed on the surface of the circumferential coat layer coated on the circumferential surface. The evaluation was "good" if the step is less than 1 mm and was "unacceptable" if the step is not less than 1 mm. In addition, the measurement of the step was performed by placing a ruler to be perpendicular to the surface of the circumferential coat layer of the circumferentially coated honeycomb structure on which the circumferential coating material is applied and dried and reading a value of a place having a maximum step.

The comprehensive evaluation was determined as "good" when both of the evaluation of uneven coating and the evaluation of withdrawal marks are good, as "acceptable" when the evaluation of uneven coating is acceptable and the evaluation of withdrawal marks is good, and as "unacceptable" when at least one of the evaluation of uneven coating and the evaluation of withdrawal marks is unacceptable.

TABLE 2

|  | Discharge amount d of circumferential coating material g | Coating amount c of circumferential coating material g | Discharge- amount/coating- amount ratio (d/c) | Evaluation | | |
|---|---|---|---|---|---|---|
|  |  |  |  | Uneven coating | Withdrawal marks | Overall |
| Example 1 | 537 | 222.9 | 2.4 | Good | Good | Good |
| Example 2 | 268.5 | 219.5 | 1.2 | Good | Good | Good |
| Example 3 | 268.5 | 216.9 | 1.2 | Good | Good | Good |
| Example 4 | 235.5 | 219.0 | 1.1 | Good | Good | Good |
| Example 5 | 405 | 362.5 | 1.1 | Good | Good | Good |
| Example 6 | 405 | 392.8 | 1.0 | Acceptable | Good | Acceptable |
| Example 7 | 537 | 216.4 | 2.5 | Good | Good | Good |
| Example 8 | 268.5 | 216.1 | 1.2 | Good | Good | Good |
| Comparative Example 1 | 537 | 220.9 | 2.4 | Unacceptable | Good | Unacceptable |
| Comparative Example 2 | 268.5 | 215.8 | 1.2 | Unacceptable | Good | Unacceptable |
| Comparative | 537 | 218.9 | 2.5 | Unacceptable | Good | Unacceptable |

TABLE 2-continued

|  | Discharge amount d of circumferential coating material | Coating amount c of circumferential coating material | Discharge-amount/coating-amount ratio | Evaluation | | |
| --- | --- | --- | --- | --- | --- | --- |
|  | g | g | (d/c) | Uneven coating | Withdrawal marks | Overall |
| Example 3 |  |  |  |  |  |  |
| Comparative Example 4 | 810 | 222.2 | 3.6 | Unacceptable | Unacceptable | Unacceptable |
| Comparative Example 5 | 405 | 219.5 | 1.8 | Unacceptable | Good | Unacceptable |
| Comparative Example 6 | 537 | 216.6 | 2.5 | Unacceptable | Good | Unacceptable |

According to this, it was confirmed that all of Examples 1 to 8 satisfying the condition etc. of the numeric range of the discharge-opening area S and the numeric range of the discharge speed V defined in the present invention obtain a good evaluation. In other words, if the discharge speed V of the circumferential coating material is in the range of 50 to 120 mm/s, it was possible to obtain a good evaluation. Furthermore, when the discharge-opening area S is in the range of 200 to 600 mm² in conjunction with the discharge speed V, it was shown that a good circumferential coating material can be applied.

On the other hand, when the discharge-opening area S exceeds 600 mm² or when the discharge speed V is less than 50 mm/s, any good evaluation cannot be obtained as shown in Comparative Examples 1 to 5. Moreover, when the discharge-opening area S is less than 200 mm² or when the discharge speed V exceeds 120 mm/s, a good evaluation cannot be obtained as shown in Comparative Example 6. Therefore, it was confirmed that the numerical limited ranges according to the area of the discharge opening and the discharge speed in the manufacturing method of the present invention are valid.

INDUSTRIAL APPLICABILITY

The method of manufacturing the honeycomb structure according to the present invention can be preferably used for manufacturing a honeycomb structure (circumferentially coated honeycomb structure) that includes a circumferential coat layer on a circumferential surface.

DESCRIPTION OF REFERENCE NUMERALS

1: manufacturing method (method of manufacturing honeycomb structure),
2, 102: honeycomb structure,
3, 104: circumferential surface,
4, 4a, 106: discharge nozzle,
5, 107: circumferential coating material,
6, 6a, 105: discharge opening,
7, 101: circumferential coat layer,
8: cell,
8a: incomplete cell,
9: partition wall,
10: scraping spatula,
11: nozzle body,
12: nozzle tip,
13: arm,
100: coating applicator,
103: turntable,
A: rotation direction,
C: rotation center,
F1: circumferential coat layer forming process,
H: height of discharge opening,
P: discharge pressure,
S: area of discharge opening,
V: discharge speed,
W1: upper-end width,
W2: lower-end width,
q: supplied amount of circumferential coating material,
ρ: density of circumferential coating material

What is claimed is:

1. A method of applying a circumferential coating material on a circumferential surface of a ceramic honeycomb structure to form a circumferential coat layer, comprising:
(a) vertically aligning the longitudinal axis of the honeycomb structure and rotating the honeycomb structure around the center of the vertically-aligned longitudinal axis; and
(b) discharging the circumferential coating material from a discharge nozzle disposed at a position opposite to the circumferential surface of the honeycomb structure to apply the circumferential coating material on the circumferential surface of the rotating honeycomb structure,
wherein a discharge speed V of the circumferential coating material is 50 to 120 mm/s as calculated by:

$$V = \frac{q}{\rho \cdot S}$$

where q is the supplied amount of the circumferential coating material in grams/second, p is the density of the circumferential coating material in grams/mm³, and S in the area of the discharge opening of the discharge nozzle in mm².

2. The method of claim 1, wherein the area of the discharge opening of the discharge nozzle is 200 to 600 mm².

3. The method of claim 1, wherein the discharge opening of the discharge nozzle is trapezoidal such that the lower-end width is larger than the upper-end width.

4. The method of claim 1, wherein the honeycomb structure rotates at 5 rpm to 15 rpm.

5. The method of claim 1, wherein a discharge-amount/coating-amount ratio X is in a range of 1.1 to 3.5 as calculated by:

$$X = \frac{d}{c}$$

where $$d = q \cdot s$$

and $$c = m' - m$$

where d is the discharge amount of circumferential coating material in grams, c is the coating amount of circumferential coating material in grams, q is the supplied amount of the circumferential coating material per unit time in grams/second, s is a coating time in seconds, m' is the mass of the honeycomb structure after the circumferential coating material is applied in grams and m is the mass of the honeycomb structure before the circumferential coating material is applied in grams.

* * * * *